(12) United States Patent
Murata

(10) Patent No.: US 9,209,498 B2
(45) Date of Patent: Dec. 8, 2015

(54) ELECTRICAL STORAGE DEVICE AND SPACER

(75) Inventor: Kazuya Murata, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 61 days.

(21) Appl. No.: 14/237,760

(22) PCT Filed: Aug. 10, 2012

(86) PCT No.: PCT/IB2012/001541
§ 371 (c)(1),
(2), (4) Date: Feb. 7, 2014

(87) PCT Pub. No.: WO2013/024330
PCT Pub. Date: Feb. 21, 2013

(65) Prior Publication Data
US 2014/0205876 A1 Jul. 24, 2014

(30) Foreign Application Priority Data
Aug. 12, 2011 (JP) .................................. 2011-176698

(51) Int. Cl.
| | |
|---|---|
| H01M 2/18 | (2006.01) |
| H01M 2/14 | (2006.01) |
| H01M 10/60 | (2014.01) |
| H01M 10/61 | (2014.01) |
| H01M 10/617 | (2014.01) |
| H01M 10/613 | (2014.01) |
| H01M 10/625 | (2014.01) |
| H01M 10/6563 | (2014.01) |
| H01M 10/647 | (2014.01) |
| H01M 10/6557 | (2014.01) |

(52) U.S. Cl.
CPC ........ *H01M 10/5004* (2013.01); *H01M 10/613* (2015.04); *H01M 10/625* (2015.04); *H01M 10/647* (2015.04); *H01M 10/6557* (2015.04); *H01M 10/6563* (2015.04); *H01M 2220/20* (2013.01)

(58) Field of Classification Search
None
See application file for complete search history.

(56) References Cited

U.S. PATENT DOCUMENTS

| | | |
|---|---|---|
| 2007/0037051 A1 | 2/2007 | Kim et al. |
| 2010/0003589 A1 | 1/2010 | Yoda et al. |
| 2011/0293983 A1* | 12/2011 | Oury et al. .................... 429/120 |

FOREIGN PATENT DOCUMENTS

| | | | |
|---|---|---|---|
| JP | 2007-048750 | A | 2/2007 |
| JP | 2007-115437 | A | 5/2007 |
| JP | 2008159439 | A | 7/2008 |
| JP | 2009283193 | A | 12/2009 |
| JP | 2009301969 | A | 12/2009 |
| JP | 2010-15916 | A | 1/2010 |
| JP | 2010-153141 | A | 7/2010 |
| JP | 2010-170870 | A | 8/2010 |
| JP | 2011113702 | A | 6/2011 |
| JP | 2011113706 | A | 6/2011 |

* cited by examiner

*Primary Examiner* — Cynthia K Walls
(74) *Attorney, Agent, or Firm* — Sughrue Mion, PLLC

(57) ABSTRACT

An electrical storage device includes electrical storage elements (11); and spacers (13) arranged alternately with the electrical storage elements (11). Each of the spacers (13) includes an opposing surface that faces the adjacent electrical storage element (11), plural ribs that form cooling medium passages for a cooling medium flowing along the opposing surface, a side surface that is located on a side of end portions of the cooling medium passages, and a leg portion that protrudes from the side surface and supports the spacer (13). An upper surface of the leg portion includes a first inclined portion that extends in a manner such that a distance between the first inclined portion and the side surface increases in a direction toward a bottom surface of the leg portion.

8 Claims, 6 Drawing Sheets

ELECTRICAL STORAGE DEVICE AND SPACER

BACKGROUND OF THE INVENTION

1. Field of the Invention

The present invention relates to a technology regarding a spacer that is disposed between adjacent electrical storage elements.

2. Description of Related Art

Recently, as a global-environmentally-conscious vehicle, an electric vehicle or a hybrid vehicle that includes an electric motor for driving the vehicle attracts attention and is practically used. The electric motor is driven by electric power that is output from an electrical storage device which can be charged and discharged.

As this electrical storage device, a battery pack is known in which plural battery cells and spacers for forming a cooling medium passage between adjacent battery cells are disposed. There may be a case where a leg portion for supporting the spacer is provided on a side surface of the spacer.

FIG. 5 is an outline view of a spacer according to related art, and FIG. 6 is a side view of a battery pack according to related art. Referring to FIG. 5, an upper surface of the leg portion extends in a horizontal direction, and therefore foreign matter such as dust and dirt included in cooling air or dew condensation water is easily accumulated. When such foreign matter accumulates on the upper surface of the leg portion, electricity can be conducted between outer canned cases of adjacent battery cells as shown in FIG. 6.

SUMMARY OF THE INVENTION

The present invention suppresses accumulation of foreign matter such as dust on a leg portion of a spacer.

A first aspect of the invention relates to an electrical storage device that includes electrical storage elements; and spacers arranged alternately with the electrical storage elements. Each of the spacers includes an opposing surface that faces the adjacent electrical storage element, plural ribs that form cooling medium passages for a cooling medium flowing along the opposing surface, a side surface that is located on a side of end portions of the cooling medium passages, and a leg portion that protrudes from the side surface and supports the spacer. An upper surface of the leg portion includes a first inclined portion that extends in a manner such that a distance between the first inclined portion and the side surface increases in a direction toward a bottom surface of the leg portion.

In the configuration according to the above-described aspect, each of the electrical storage elements may include a case that houses a power generation element and a terminal electrode that is located on an upper surface side of the case, a protrusion is formed on an upper end portion of the side surface, and an upper surface of the protrusion includes a second inclined portion that extends in a manner such that a distance between the second inclined portion and the side surface increases in a direction toward a bottom surface of the protrusion. According to the above configuration, it is possible to suppress accumulation of foreign matter such as dust or accumulation of dew condensation water on the upper surface of the protrusion formed on the upper end portion of the side surface.

In the configuration according to the above-described aspect, the first inclined portion may have lower friction resistance than that of the opposing surface. According to the above configuration, the foreign matter that has fallen onto the first inclined portion easily slides down.

In the configuration according to the above-described aspect, the first inclined portion may be treated with water-repellent treatment.

In the configuration according to the above-described aspect, the second inclined portion may have lower friction resistance than that of the opposing surface. According to the above configuration, the foreign matter that has fallen onto the second inclined portion easily slides down.

In the configuration according to the above-described aspect, the second inclined portion may be treated with water-repellent treatment.

A second aspect of the invention relates to a spacer that is disposed between adjacent electrical storage elements. The spacer includes an opposing surface that faces the corresponding adjacent electrical storage element; plural ribs that form cooling medium passages for a cooling medium flowing along the opposing surface; a side surface that is located on a side of end portions of the cooling medium passages; and a leg portion that protrudes from the side surface and supports the spacer. An upper surface of the leg portion includes a first inclined portion that extends in a manner such that a distance between the first inclined portion and the side surface increases in a direction toward a bottom surface of the leg portion.

According to the above aspects of the present invention, it is possible to suppress the accumulation of foreign matter such as dust on the leg portion of the spacer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
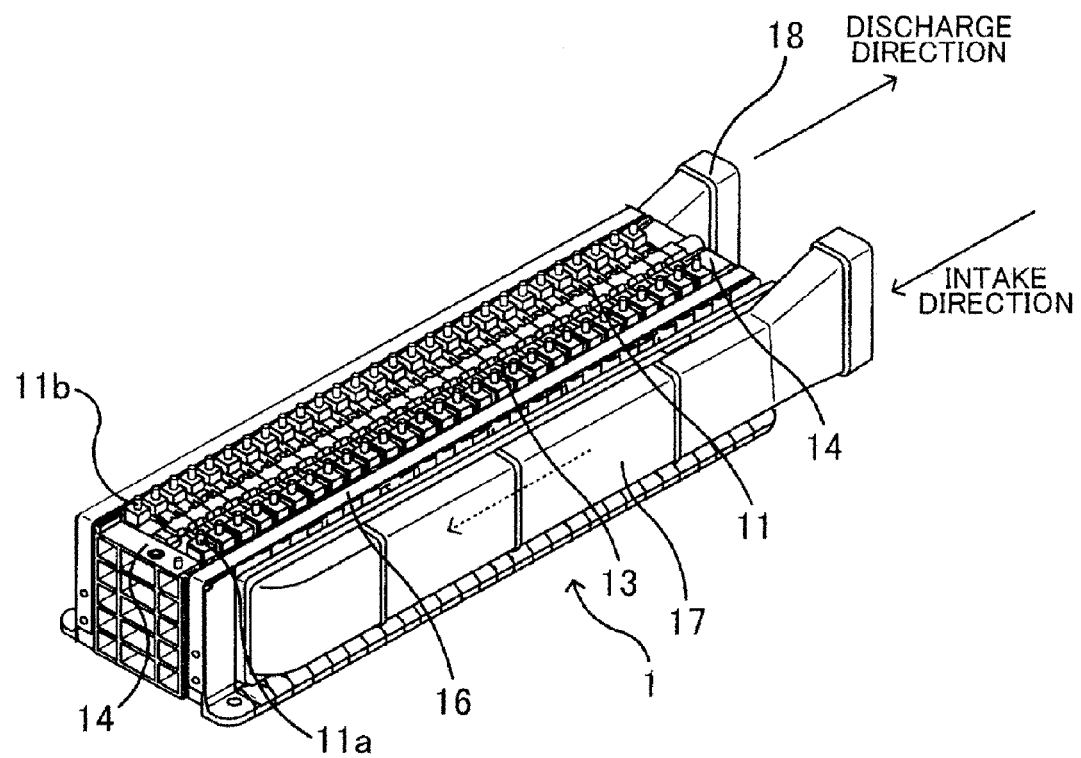
FIG. 1 is a perspective view of an electrical storage device according to an embodiment of the present invention.
Figure 2:
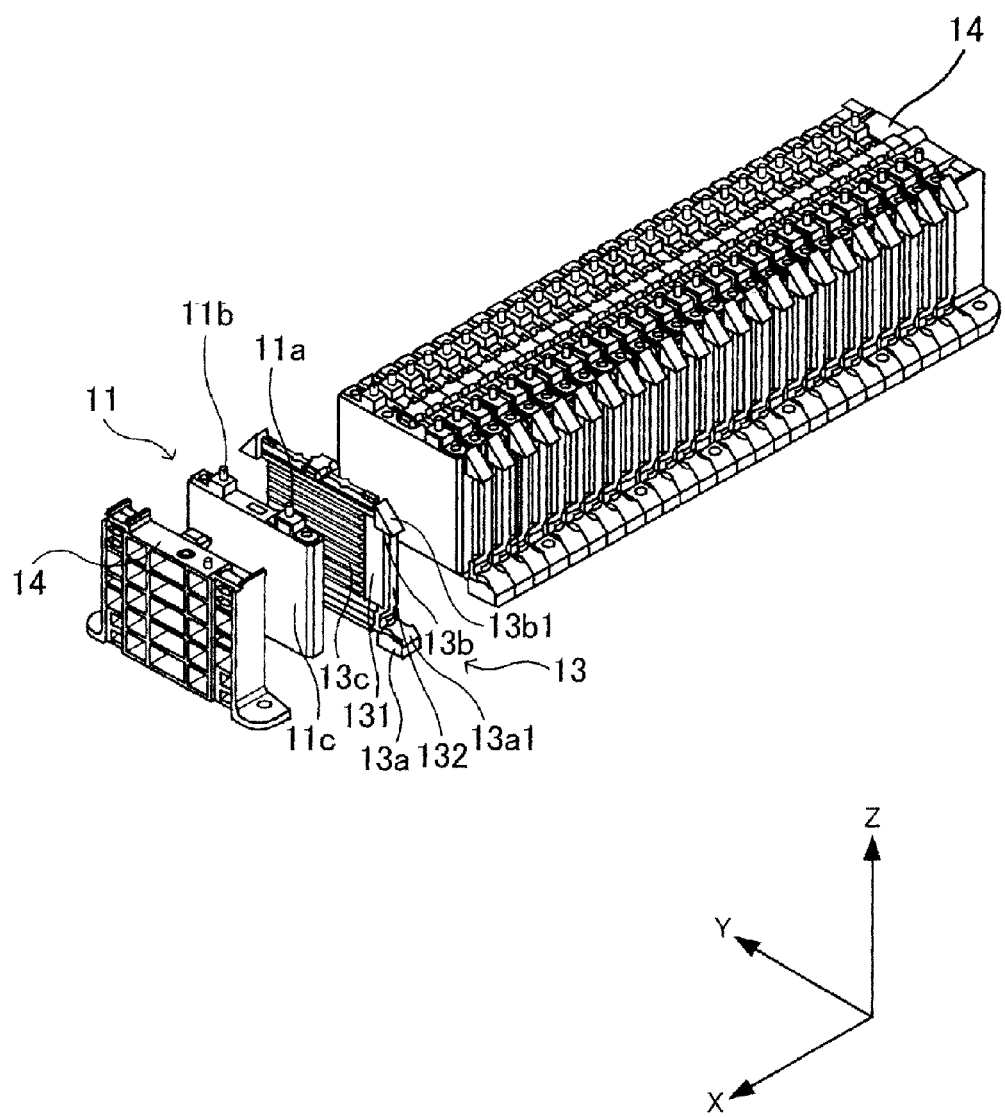
FIG. 2 is an exploded perspective view of an electrical storage device according to the embodiment of the present invention.

An outline structure of an electrical storage device according to an embodiment of the present invention is described with reference to FIG. 1 and FIG. 2. FIG. 1 is a perspective view of the electrical storage device, and FIG. 2 is an exploded perspective view of the electrical storage device. Arrows shown in FIG. 1 indicate an intake direction and a discharge direction. In FIG. 2, an intake chamber, a discharge chamber, and a restraint band are not shown.

The electrical storage device 1 includes plural battery cells (electrical storage elements) 11, plural spacers 13, and end plates 14. The battery cells 11 are arranged at predetermined intervals in an X-axis direction, and a spacer 13 is disposed between the adjacent battery cells 11. The end plates 14 are positioned in respective ends in the X-axis direction, and the plural battery cells 11 and the spacers 13 are sandwiched between the end plates 14.

Each battery cell 11 includes a so-called rectangular case 11*c*, and a power generation element is housed in the case 11*c*. The battery cell 11 may be a lithium-ion secondary battery. On an upper end surface side of the battery cell 11, a positive terminal 11*a* and a negative terminal 11*b* are provided in a Y-axis direction. The battery cells 11 adjacent in the X-axis direction are connected in series through a bus bar (not shown). A restraint band 16 extends in the X-axis direction along the upper end surface of the electrical storage device 1, and both ends of the restraint band 16 bend downward. Bend portions are fixed to the end plates 14, and therefore the paired end plates 14 are pressed toward each other. Accordingly, performance of the plural battery cells 11 is maintained.

One end surface of the electrical storage device 1 in the Y-axis direction is provided with an intake chamber 17 through which a cooling medium (cooling wind) is introduced into the electrical storage device 1, and the other end surface is provided with a discharge chamber 18 through which the cooling medium (cooling wind), which has been introduced into the electrical storage device 1, is discharged.

Figure 3:
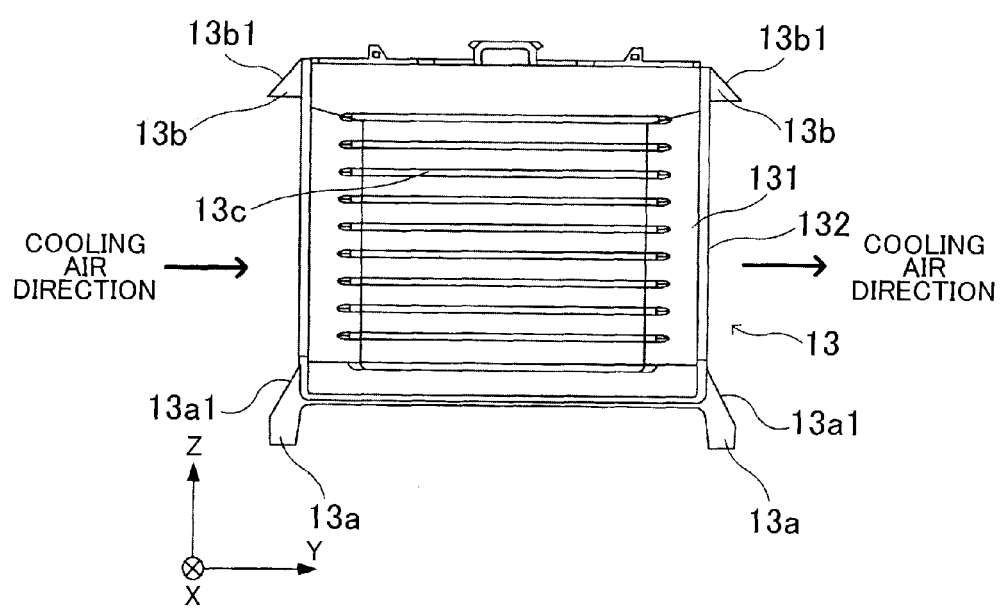
FIG. 3 is an outline view of a spacer according to the embodiment of the present invention which is seen in an X-axis direction.

Next, the structure of the spacer 13 is described with reference to FIG. 3. FIG. 3 is an outline view of the spacer which is seen in the X-axis direction.

The spacer 13 includes spacer opposing surfaces (opposing surfaces) 131, plural ribs 13*c*, spacer side surfaces (side surfaces) 132, leg portions 13*a*, and upper protrusions 13*b*. The spacer opposing surface 131 faces the adjacent electrical storage element 11 and extends in a Y-Z-plane direction. The plural ribs 13*c* extend in a direction where the cooling medium flows, that is, in the Y-axis direction. The ribs 13*c* are formed at predetermined intervals in a top-bottom direction (Z-axis direction). The cooling medium flows in the Y-axis direction in the cooling medium passages each of which is provided between the ribs 13*c* adjacent in the top-bottom direction. The spacer 13 may be made of resin. Each spacer side surface 132 is located on a-side of end portions of the cooling medium passages.

Each leg portion 13*a* is formed in a lower end portion of the corresponding spacer side surface 132 and supports the spacer 13. The leg portion 13*a* may be fixed on a floor panel of the vehicle. An upper surface of the leg portion 13*a* includes an inclined leg surface 13*a*1 that extends in a manner such that a distance between the inclined leg surface 13*a*1 and the spacer side surface 132 increases in a direction toward a bottom surface of the leg portion 13*a*. In other words, in FIG. 3, the inclined leg surface 13*a*1 is inclined outwardly with respect to the spacer side surface 132 in the direction toward the bottom surface of the leg portion 13*a*. Each cooling medium passage is narrow, and therefore if foreign matter such as dust and hair is contained in the air introduced through the intake chamber 17, a part of the foreign matter does not enter the cooling medium passage and may fall onto the inclined leg surface 13*a*1 that is located below an inlet of the cooling medium passage. The foreign matter, which has fallen onto the inclined leg surface 13*a*1, slides down along the inclined leg surface 13*a*1. Thus, accumulation of the foreign matter on the leg portion 13*a* can be suppressed. Accordingly, it is possible to suppress the accumulation of the foreign matter between two leg portions 13*a* adjacent in the X-axis direction, and to suppress conduction of electricity between the cases 11*c* of the battery cells 11 adjacent in the X-axis direction through the accumulated foreign matter. When dew condensation occurs on the leg portion 13*a*, the dew condensation water drops along the inclined leg surface 13*a*1. Therefore, it is possible to suppress the accumulation of water on the upper surface of the leg portion 13*a*. Accordingly, it is possible to suppress conduction of electricity between the cases 11*c* of the battery cells 11 adjacent in the X-axis direction due to the presence of water between two leg portions 13*a* adjacent in the X-axis direction.

When foreign matter is contained in the cooling medium that passes through the cooling medium passage, a part of the foreign matter may fall onto the inclined leg surface 13*a*1 that is located below an outlet of the cooling medium passage. The foreign matter, which has fallen onto the inclined leg surface 13*a*1, slides down along the inclined leg surface 13*a*1, and therefore the same effect described above can be obtained.

The upper surface of the leg portion 13*a* is changed from a flat surface extending in the horizontal direction to an inclined surface, and accordingly an area that receives the foreign matter and water increases. Thus, even if a part of the foreign matter does not fall due to friction resistance, it is possible to increase the time period during which the foreign matter is not present on the leg portion 13*a*.

Low friction treatment may be performed on the inclined leg surface 13*a*1 (i.e., the inclined leg surface 13*a*1 may be treated with low friction treatment) so that the friction resistance of the inclined leg surface 13*a*1 is lower than that of the other exterior surfaces of the spacer (e.g., the spacer opposing surface 131). The low friction treatment may be water-repellent treatment in which fluororesin is applied to the inclined leg surface 13*a*1. The foreign matter or water that has fallen onto the inclined leg surface 13*a*1 easily slides down due to the decrease of the friction resistance of the inclined leg surface 13*a*1.

Each upper protrusion 13*b* protrudes from the corresponding spacer side surface 132. Sealing performance of the cooling medium passage can be secured by forming the upper protrusion 13*b*. As shown in FIG. 3, an upper surface of the upper protrusion 13*b* may include an inclined protrusion surface 13*b*1. The inclined protrusion surface 13*b*1 is an inclined surface, and extends in a manner such that a distance between the inclined protrusion surface 13*b*1 and the spacer side surface 132 increases in a direction toward a lower surface (bottom surface) of the upper protrusion 13*b*. In other words, in FIG. 3, the inclined protrusion surface 13*b*1 is inclined outwardly with respect to the spacer side surface 132 in the direction toward the bottom surface of the upper protrusion 13*b*. The foreign matter that has fallen onto the upper protrusion 13*b* falls along the inclined protrusion surface 13*b*1, and therefore the accumulation of the foreign matter on the upper protrusion 13*b* can be suppressed. If the upper protrusion 13*b* does not include the inclined surface and is formed in a flat shape extending in the horizontal direction, electricity may be conducted between the positive terminal 11*a* and the negative terminal 11*b* of the battery cells 11 which are adjacent in the X-axis direction (that is, terminals with opposite polarities in the adjacent battery cells 11) due to the accumulated foreign matter. Such a problem can be solved by forming the upper surface of the upper protrusion 13*b* in the inclined shape. The low friction treatment as described above may be applied to the inclined protrusion surface 13*b*1.

Modified Example 1

Figure 4:
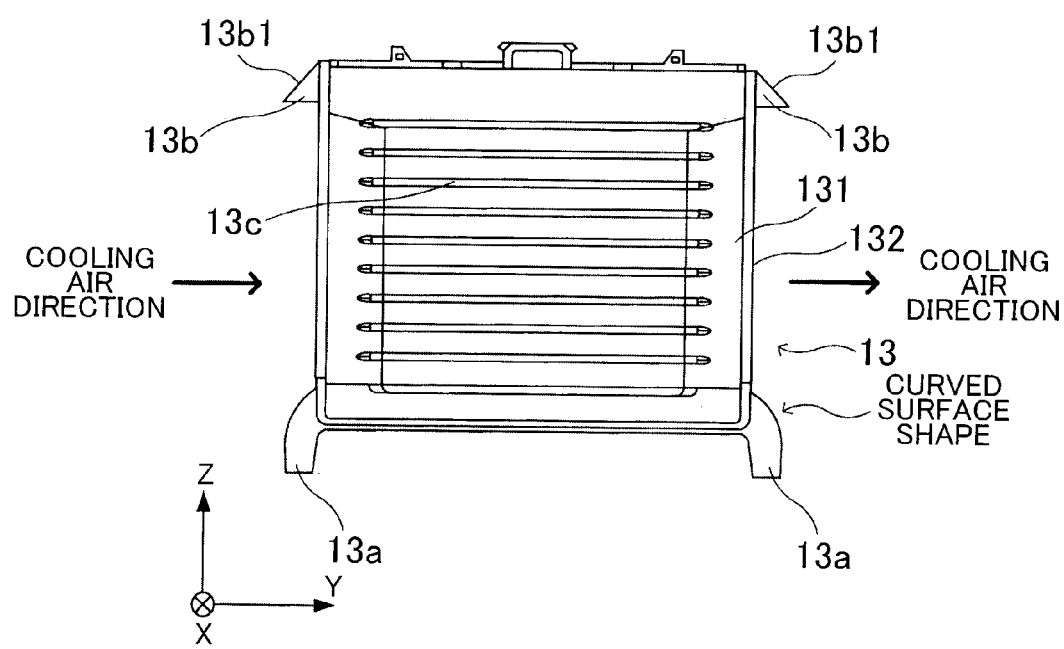
FIG. 4 is an outline view of a spacer according to a modified example of the present invention.
Figure 5:
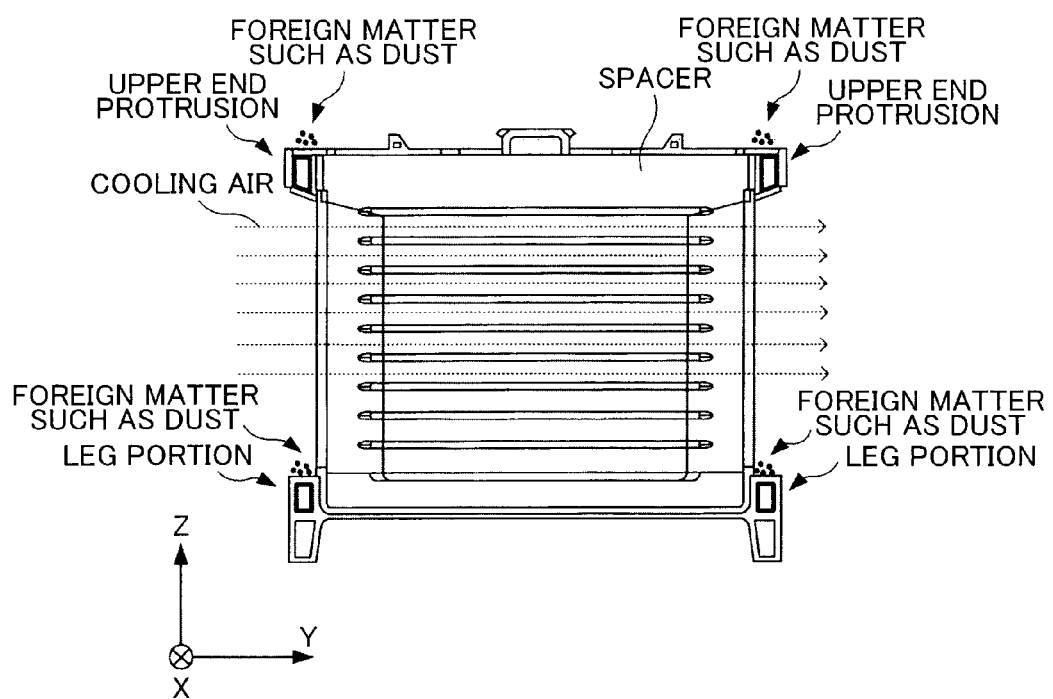
FIG. 5 is an outline view of a spacer of related art.
Figure 6:
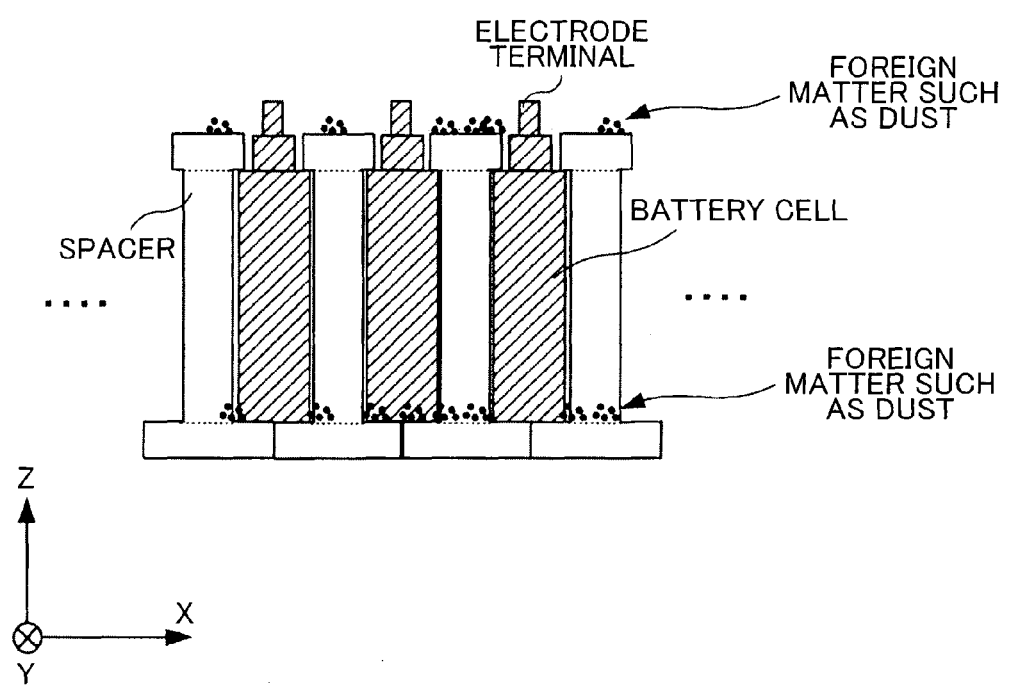
FIG. 6 is a side view of a battery pack of related art.

In the embodiment described above, the inclined leg surface 13*a*1 is a flat surface that obliquely extends downward. However, the present invention is not limited to the above structure, and the inclined leg surface may have other shape as long as the foreign matter or water falls. For example, the inclined leg surface 13*a*1 may be a curved surface as shown in FIG. 4. In addition, the inclined leg surface 13a1 may be a curved surface that protrudes in a direction opposite to the direction in which the curved surface shown in FIG. 4 protrudes.

Modified Example 2

In the embodiment described above, the upper protrusion 13b includes the inclined protrusion surface 13b1. However, the present invention is not limited to the above structure, and the inclined protrusion surface 13b1 may not be formed. The foreign matter such as dust easily accumulates in a lower side. Therefore, if the foreign matter hardly accumulates on the upper protrusion 13b due to design of the cooling medium passage, the inclined protrusion surface 13b1 may not be formed. In this case, the upper surface of the upper protrusion 13b may have a flat shape that extends in the horizontal direction.

Modified Example 3

In the embodiment described above, the entire upper surface of the leg portion 13a is formed in an inclined shape. However, the present invention is not limited to the above structure, and a part of the upper surface may be formed in the inclined shape.

Modified Example 4

In the embodiment described above, the cooling medium passage is formed such that the intake direction in the intake chamber 17 and the discharge direction in the discharge chamber 18 are opposite to each other. However, the present invention is not limited to the above structure, and intake direction and the discharge direction may be the same direction.

Modified Example 5

In the embodiment described above, a method of applying the fluororesin is adopted as the method of applying low friction treatment on the inclined leg surface 13a1 (inclined protrusion surface 13b1). However, the present invention is not limited to the method, and other methods, may be adopted. For example, the inclined leg surface 13a1 (inclined protrusion surface 13b1) may be polished.

Modified Example 6

In the embodiment described above, the battery cell 11 that includes one power generation element is used. However, the present invention is not limited to the above structure, and a battery module (electrical storage element), in which plural power generation elements are connected in a case, may be used.

Reference Example

When a protruding portion other than the leg portion 13a or the upper protrusion 13b is formed in the spacer side surface 132, an upper surface of the protruding portion may include an inclined portion.

The invention claimed is:

1. An electrical storage device comprising:
   electrical storage elements; and
   spacers arranged alternately with the electrical storage elements, each of the spacers including an opposing surface that faces the adjacent electrical storage element, plural ribs that form cooling medium passages for a cooling medium flowing along the opposing surface, a side surface that is located on a side of end portions of the cooling medium passages, and a leg portion that protrudes from the side surface and supports the spacer, and an upper surface of the leg portion including a first inclined portion that extends in a manner such that a distance between the first inclined portion and the side surface increases in a direction toward a bottom surface of the leg portion, wherein
   the first inclined portion has lower friction resistance than that of the opposing surface.

2. The electrical storage device according to claim 1, wherein the first inclined portion is a flat surface that obliquely extends downward.

3. The electrical storage device according to claim 1, wherein the first inclined portion is a curved surface.

4. The electrical storage device according to claim 1, wherein each of the electrical storage elements includes a case that houses a power generation element and a terminal electrode that is located on an upper surface side of the case, a protrusion is formed on an upper end portion of the side surface, and an upper surface of the protrusion includes a second inclined portion that extends in a manner such that a distance between the second inclined portion and the side surface increases in a direction toward a bottom surface of the protrusion.

5. The electrical storage device according to claim 1, wherein the first inclined portion is treated with water-repellent treatment.

6. The electrical storage device according to claim 4, wherein the second inclined portion has lower friction resistance than that of the opposing surface.

7. The electrical storage device according to claim 6, wherein the second inclined portion is treated with water-repellent treatment.

8. A spacer that is disposed between adjacent electrical storage elements, comprising:
   an opposing surface that faces the corresponding adjacent electrical storage element;
   plural ribs that form cooling medium passages for a cooling medium flowing along the opposing surface;
   a side surface that is located on a side of end portions of the cooling medium passages; and
   a leg portion that protrudes from the side surface and supports the spacer, an upper surface of the leg portion including a first inclined portion that extends in a manner such that a distance between the first inclined portion and the side surface increases in a direction toward a bottom surface of the leg portion, wherein
   the first inclined portion has lower friction resistance than that of the opposing surface.

* * * * *